US012592517B2

(12) United States Patent
Chien

(10) Patent No.: US 12,592,517 B2
(45) Date of Patent: Mar. 31, 2026

(54) SEESAW ASSEMBLY WITH A CONNECTOR RETAINING LATCH DISENGAGEMENT MECHANISM

(71) Applicant: DELL PRODUCTS L.P., Round Rock, TX (US)

(72) Inventor: Tung Yu Chien, New Taipei (TW)

(73) Assignee: Dell Products L.P., Round Rock, TX (US)

(*) Notice: Subject to any disclaimer, the term of this patent is extended or adjusted under 35 U.S.C. 154(b) by 398 days.

(21) Appl. No.: 18/316,122

(22) Filed: May 11, 2023

(65) Prior Publication Data

US 2024/0380164 A1 Nov. 14, 2024

(51) Int. Cl.
*H01R 13/635* (2006.01)
*H01R 13/518* (2006.01)
*H01R 13/627* (2006.01)

(52) U.S. Cl.
CPC ......... *H01R 13/635* (2013.01); *H01R 13/518* (2013.01); *H01R 13/6272* (2013.01); *H01R 2201/04* (2013.01)

(58) Field of Classification Search
CPC ......................... H01R 13/635; H01R 13/6335; H01R 13/518; H01R 13/6272; H01R 2201/04
USPC ............................................... 439/352, 476.1
See application file for complete search history.

(56) References Cited

U.S. PATENT DOCUMENTS 6,254,418 B1 * 7/2001 Tharp ................ H01R 13/6335 439/352
7,407,402 B1 * 8/2008 Peng .................. H01R 13/6335 439/352
8,512,062 B1 * 8/2013 Zhou .................... H01R 13/635 439/352
10,140,238 B2 11/2018 Mundt et al.
10,547,142 B1 * 1/2020 Henry .................... H01R 12/79
10,721,835 B2 7/2020 Chen et al.
11,073,874 B2 7/2021 Escamilla et al.
11,502,451 B1 * 11/2022 Foung .................. H01R 13/635
2005/0075001 A1 * 4/2005 Shearman .............. H01R 43/26 439/352
2008/0311781 A1 * 12/2008 Wojcik ................. H01R 13/506 439/352
2011/0111617 A1 * 5/2011 Handshaw ............. H01R 43/26 439/352
2014/0148039 A1 * 5/2014 Huang ............... H01R 13/6272 439/352
2014/0315414 A1 * 10/2014 Gao ....................... H01R 43/26 439/352

FOREIGN PATENT DOCUMENTS

CN 114784560 A * 7/2022 ........... H01R 13/508

* cited by examiner

*Primary Examiner* — Gary F Paumen
(74) *Attorney, Agent, or Firm* — Larson Newman, LLP

(57) ABSTRACT

A seesaw assembly includes a base bracket rotatably coupled to a seesaw bracket. The seesaw bracket rotates around a pivot when a force is applied on an actuator end of the seesaw bracket. A sloped end of the seesaw bracket moves in a direction opposite of the actuator end as the seesaw bracket rotates around the pivot that pushes down a retaining latch of a cable connector releasing the cable connector from a port.

20 Claims, 7 Drawing Sheets

SEESAW ASSEMBLY WITH A CONNECTOR RETAINING LATCH DISENGAGEMENT MECHANISM

FIELD OF THE DISCLOSURE

The present disclosure generally relates to information handling systems, and more particularly relates to a seesaw assembly with a connector retaining latch disengagement mechanism.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A seesaw assembly includes a base bracket rotatably coupled to a seesaw bracket. The seesaw bracket rotates around a pivot when a force is applied on an actuator end of the seesaw bracket. A sloped end of the seesaw bracket moves in a direction opposite of the actuator end as the seesaw bracket rotates around the pivot that pushes down a retaining latch of a cable connector releasing the cable connector from a port.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
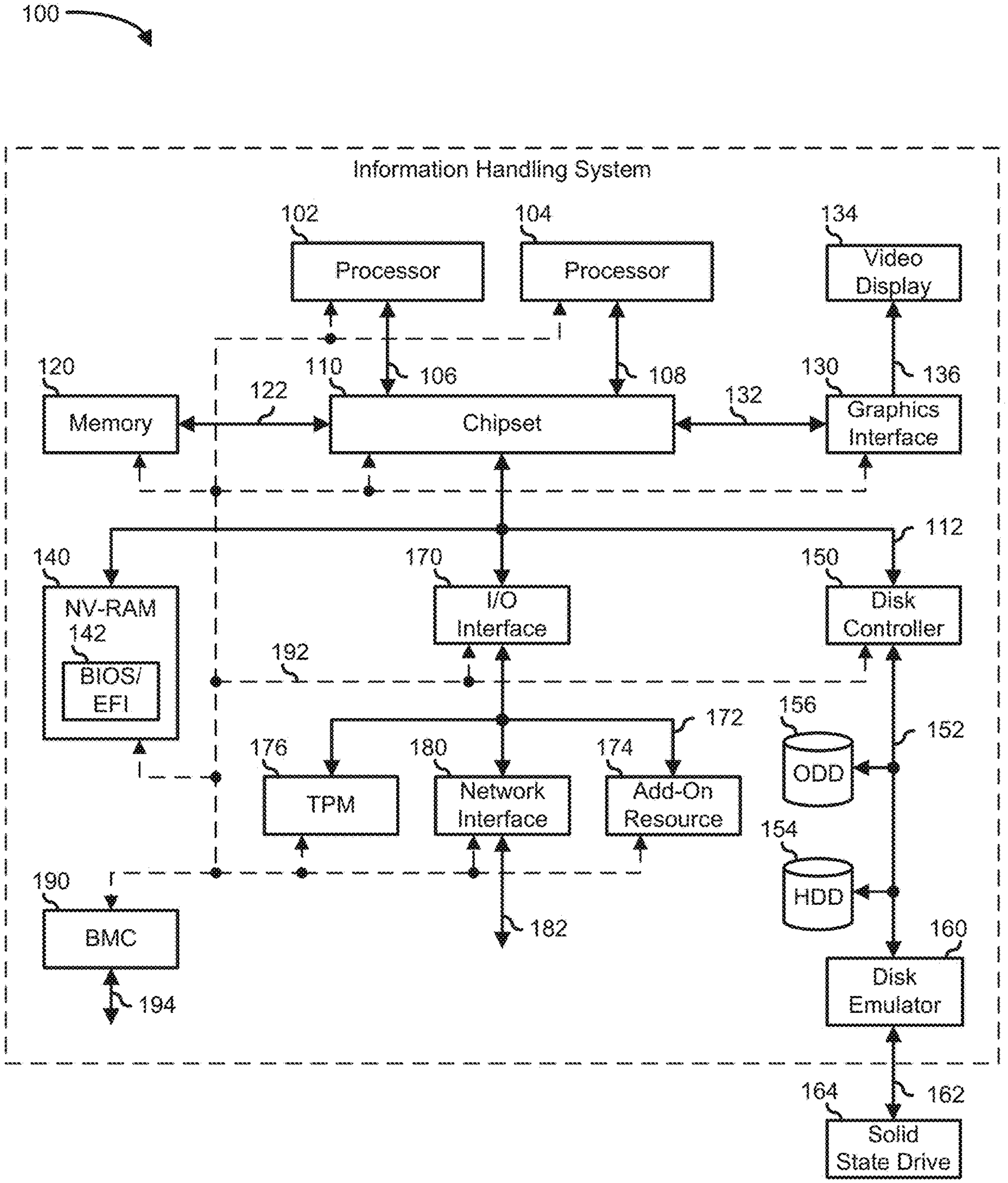
FIG. 1 is a diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a double data rate (DDR) memory channel and memory 120 represents one or more DDR dual in-line memory modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as dynamic random access memory (DRAM) DIMMs, static random access memory (SRAM) DIMMs, non-volatile DIMMs (NV-DIMMs), storage class memory devices, read-only memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 1640 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board, or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth© or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device, a BMC may be referred to as an embedded controller (EC). A BMC included in a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100 and can include an $I^2C$ bus, a System Management Bus (SMBus), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish© interface), various vendor defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 1600. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional buses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, $I^2C$ and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Rackmount appliances, such as a rackmount server, may have different heights typically designated in rack units. A rackmount appliance with a height of two rack units or greater may have its top and bottom portions occupied by various components, such as PCIe cards. At times mounting features of the components at the top portion may interfere with access to one or more components at the bottom portion. For example, the bottom portion may include a mezzanine card with a connector interface wherein a modular connector may be plugged into. However, access to the modular connector may be restricted due to the interference of a component located at the top of the modular connector. In one particular example, finger access to plug or unplug a registered jack connector or similar may be limited by a mounting feature of the component at the top. To address this and other concerns, the present disclosure provides a seesaw assembly with a seesaw function that allows access to a restraining latch of a connector, thus allowing a user to access to plug or unplug the connector without interference.

Figure 2:
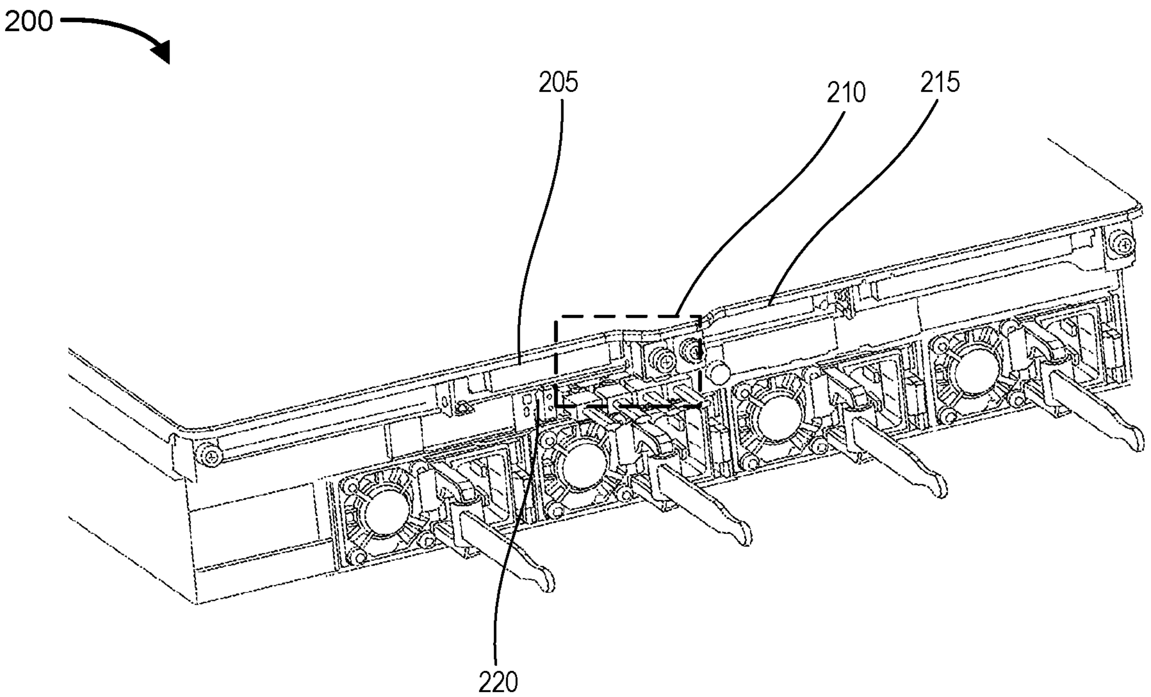
FIG. 2 is a perspective view illustrating a section of an information handling system, according to an embodiment of the present disclosure.

FIG. 2 shows a section of an information handling system 200. Information handling system 200 may be similar to information handling system 100 of FIG. 1. Further, in this example, information handling system 200 may be a rack-mount server that is two rack units in height. Information handling system 200 includes a PCIe card 205, a PCIe card 215, and a mezzanine card 220. Each one of PCIe cards 205 and 215 may be connected to the back surface of information handling system 200 via a mounting feature of a PCIe riser. Mezzanine card 220 may be an open compute project (OCP) network mezzanine card. A typical OCP network mezzanine card may have a width of three PCIe connector slots. Information handling system 200 includes a section 210 which is shown in greater detail in FIG. 3.

Figure 3:
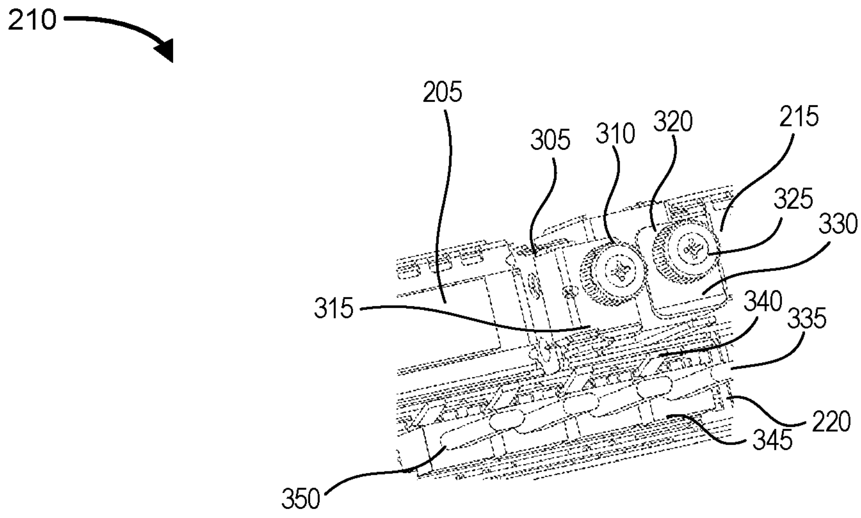
FIG. 3 is an enlarged perspective view illustrating a section of an information handling system, according to an embodiment of the present disclosure.

FIG. 3 shows an expanded view of section 210 of information handling system 200. Section 210 shows a portion of PCIe cards 205 and 215 with mounting features. The perspective view also includes a portion of mezzanine card 220. PCIe card 205 may be connected to information handling system 200 via a mounting feature 305 that includes a fastener 310 and a cage nut 315. PCIe card 215 may be connected to information handling system 200 via a mounting feature 320 that includes a fastener 325 and a cage nut 330. Examples of fasteners include rivets, screws, machine screws, bolts, nuts, pins, ties, etc. Fasteners 310 and 325 may be mounting screws or similar. Mounting features 305 and 320 may also be used to retain a seesaw assembly against information handling system 200 of FIG. 2. For example, fasteners 310 and 325 with cage nuts 315 and 330 may be used to physically couple the seesaw assembly to information handling system 200. However, one of the ordinary skill in the art would appreciate that different types of fasteners than those depicted may be used.

Mezzanine card 220 may be located below one or both PCIe cards 205 and 215. In this example, mezzanine card 220 includes one or more ports, also referred to as sockets, with cables plugged into them, such as cables 335 and 350. The sockets may be ethernet ports or ethernet sockets and/or a variety of female ports known in the art. Cables 335 and 350 may be ethernet cables, such as registered jack (RJ) 45 cables, RJ11 cables, category 6 cables, or similar. Cable 335 includes a connector 345 that is plugged into one of the sockets of mezzanine card 220. Connector 345 may be a registered jack (RJ) connector, such as an RJ45 connector, RJ11 connector, a category 6 connector, or similar. These connectors typically require manual removal by depressing their locking tab, also referred to as a retaining latch, to unplug the connectors by pulling the cable while the locking tab is depressed. Depressing the locking tab disengages hook features of the locking tab from stop features of the socket. Thus, releasing the connector from the socket allows the cable to be unplugged.

Connector 345 includes a retaining latch 340 that is disposed underneath one or both mounting features 305 and 320. In particular, connector 345 may be located underneath cage nuts 315 and 330, such that the space between retaining latch 340 and cage nuts 315 and 330 limits finger access to retaining latch 340 when plugging and/or unplugging cable 335. This is in contrast to the space for finger access of cable 350 which is not restricted by a mounting feature in this example.

Figure 4:
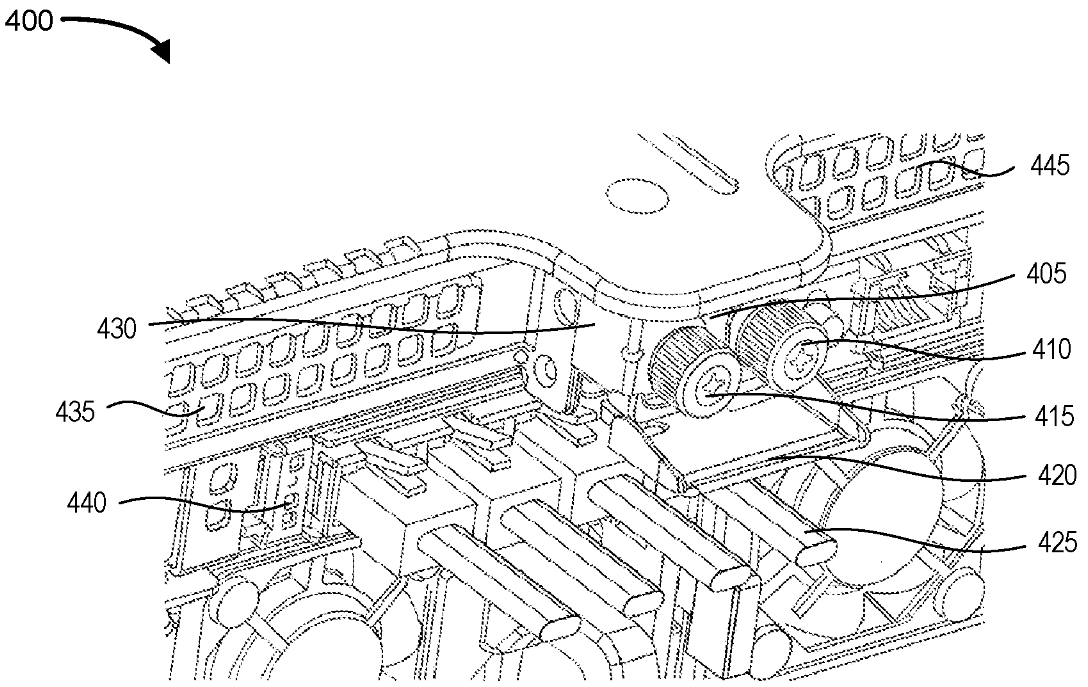
FIG. 4 is a perspective view illustrating a section of an information handling system, according to an embodiment of the present disclosure.

FIG. 4 shows a perspective view of section 400 of an information handling system. The information handling system may be similar to information handling system 200 of FIG. 2. Section 400 includes a seesaw assembly feature, also referred to herein simply as a seesaw assembly, and is configured with a modular connector latch disengagement mechanism. The seesaw assembly may be attached to the information handling system via mounting features 430 and 410 of PCIe cards 435 and 445 respectively. In this example, mounting feature 410 includes a fastener 415, wherein fastener 415 may be screwed into one of mounting holes of seesaw assembly 405. Seesaw assembly 405 includes a seesaw bracket 420 which is disposed above one or more cables, such as cable 425, that are inserted into sockets of mezzanine card 440. In this example, mezzanine card 440 is disposed between PCIe cards 435 and 445 and mezzanine card 440. Access to locking tabs of the cables plugged into the sockets of mezzanine card 440 is limited due to the mounting features of PCIe cards 435 and 445. The connector latch disengagement feature of seesaw assembly 405 may allow a user to flip one end of seesaw assembly 405 which may automatically rotate another end to press on a retaining latch of a cable connector. This releases the retaining latch from a locked state allowing the user to unplug the cable.

Figure 5:
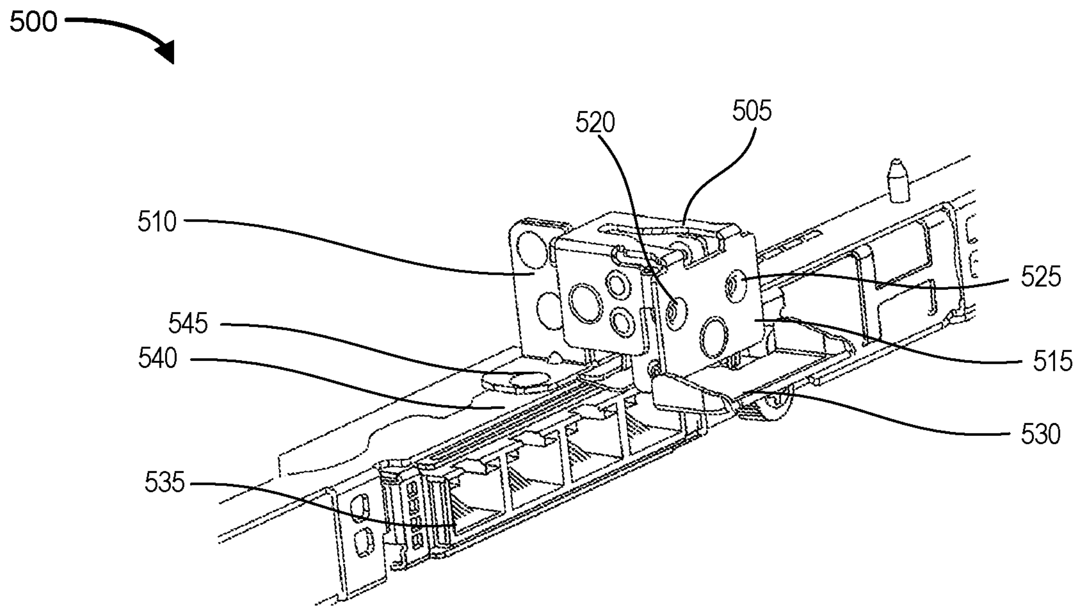
FIG. 5 is a perspective view illustrating a section of an information handling system, according to an embodiment of the present disclosure.

FIG. 5 shows a perspective view of section 500 of an information handling system. Section 500 is shown with various components removed to highlight certain features. Section 500 includes a seesaw assembly 505 that is configured with a modular connector latch disengagement mechanism. The information handling system may be similar to information handling system 200 of FIG. 2. In this example, PCIe cards and cables plugged into a mezzanine card are removed to show how seesaw assembly 505 is physically connected to the information handling system. Seesaw assembly 505 may be similar to seesaw assembly 405 of FIG. 4. In this example, the PCIe cards on top of mezzanine card 535 have been removed to show how a base bracket 510 of seesaw assembly 505 may be physically coupled to a bridge bracket 540 via a fastener 545. In this example, fastener 545 may be a rivet or similar. Bridge bracket 540 may be part of a chassis base assembly of the information handling system. Seesaw assembly 505 may also include a retainer 515 that further includes mounting holes 520 and 525. Mounting holes 520 and 525 may be used by mounting screws to physically couple PCIe cards to the information handling system. In addition, seesaw assembly 505 includes a seesaw bracket 530 that may be disposed proximate to mezzanine card 535.

Figure 6:
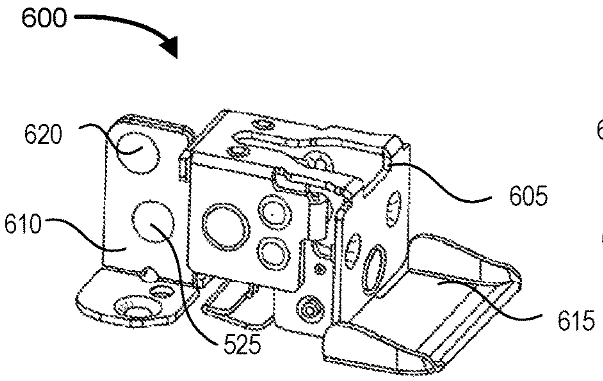
FIG. 6 is a perspective view illustrating a seesaw assembly, according to an embodiment of the present disclosure.
Figure 7:
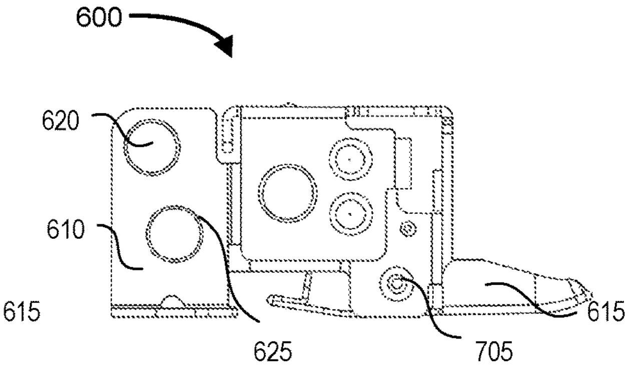
FIG. 7 is a side view of a seesaw assembly, according to an embodiment of the present disclosure.

FIG. 6 shows a perspective view of a seesaw assembly 600, which is similar to seesaw assembly 505 of FIG. 5. Seesaw assembly 600 includes a retainer 605, a base bracket 610, and a seesaw bracket 615. Base bracket 610 may be physically coupled to retainer 605 and/or seesaw bracket 615 via fasteners 620 and 625. Fasteners 620 and 625 may be rivets or similar. FIG. 7 shows a side view of seesaw assembly 600. This view shows how base bracket 610 may be pivotably coupled to seesaw bracket 615 via a rivet pin 705.

Figure 8:
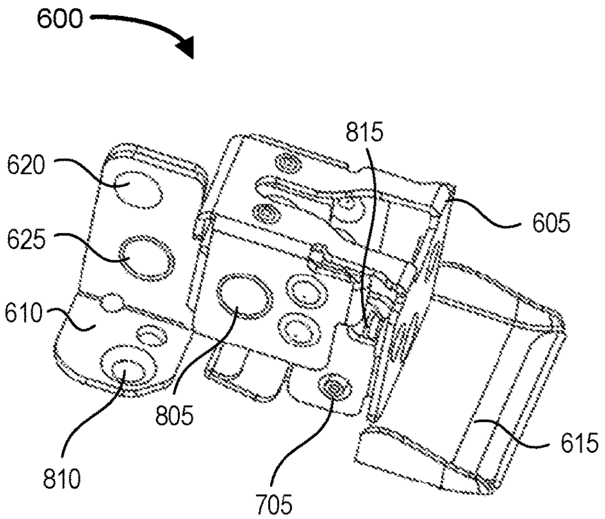
FIG. 8 is a perspective view of a seesaw assembly, according to an embodiment of the present disclosure.

FIG. 8 shows a perspective view of seesaw assembly 600. This perspective view is from one side of seesaw assembly 600. Base bracket 610 may be physically coupled to retainer 605 via fastener 805. Fastener 805 may be a rivet or similar. Base bracket 610 also includes an opening 810 which may be a screw hole, a mounting hole, or the like for a fastener to physically couple base bracket 610 to a base bracket of a chassis of an information handling system. A spring 815, such as a helical spring, may be wrapped around rivet pin 705 which is used as a pivot point or fulcrum when seesaw bracket 615 is engaged.

Figure 9:
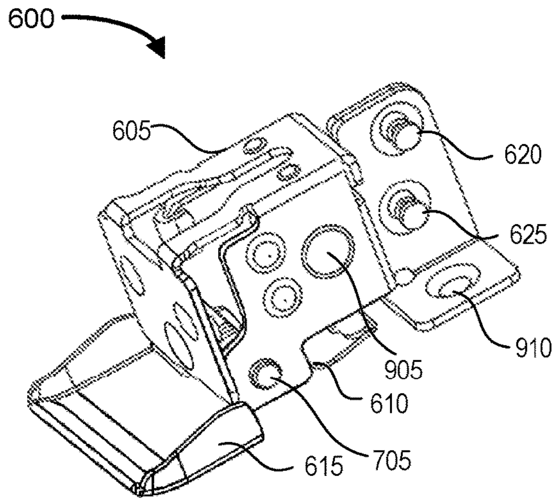
FIG. 9 is a perspective view of a seesaw assembly, according to an embodiment of the present disclosure.

FIG. 9 shows a perspective view of seesaw assembly 600. This perspective view is from one side of seesaw assembly 600. Base bracket 610 may be physically coupled to retainer 605 via fastener 905. Retainer 605 may include an opening 910 for which a fastener, such as a screw or the like, to physically couple seesaw assembly 600 to a base bracket of a chassis of an information handling system.

Figure 10:
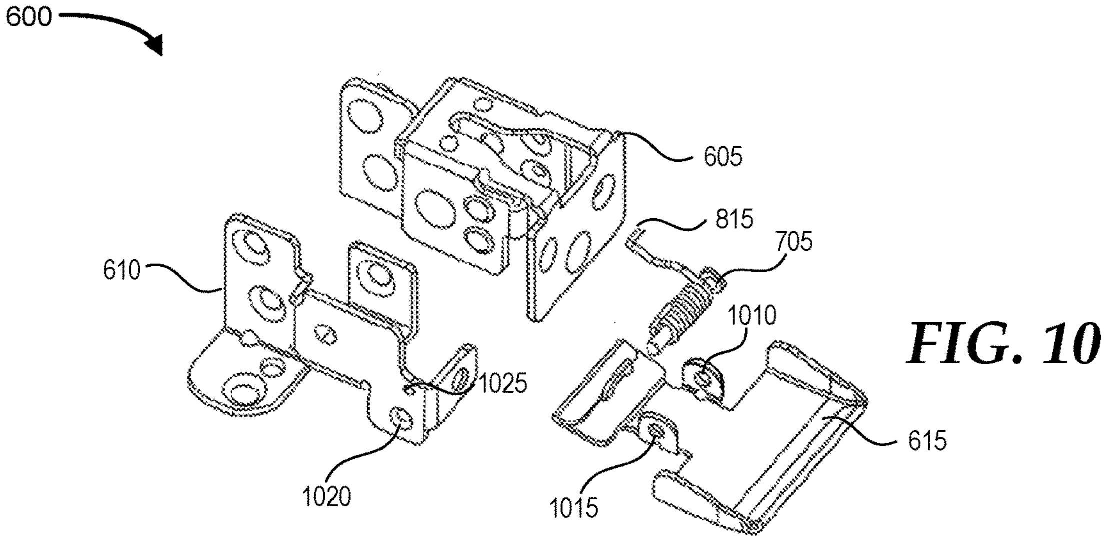
FIG. 10 is an exploded perspective view of a seesaw assembly, according to an embodiment of the present disclosure.

FIG. 10 shows an exploded view of seesaw assembly 600. The exploded view shows base bracket 610, retainer 605, seesaw bracket 615, rivet pin 705, and spring 815. Seesaw bracket 615 includes openings 1010 and 1015. Rivet pin 705 with spring 915 may be inserted or pushed from opening 1010 through opening 1015 and further through an opening 1020 of base bracket 610. In addition, one end of spring 815 may also pass through opening 1025 of base bracket 610.

Figure 11:
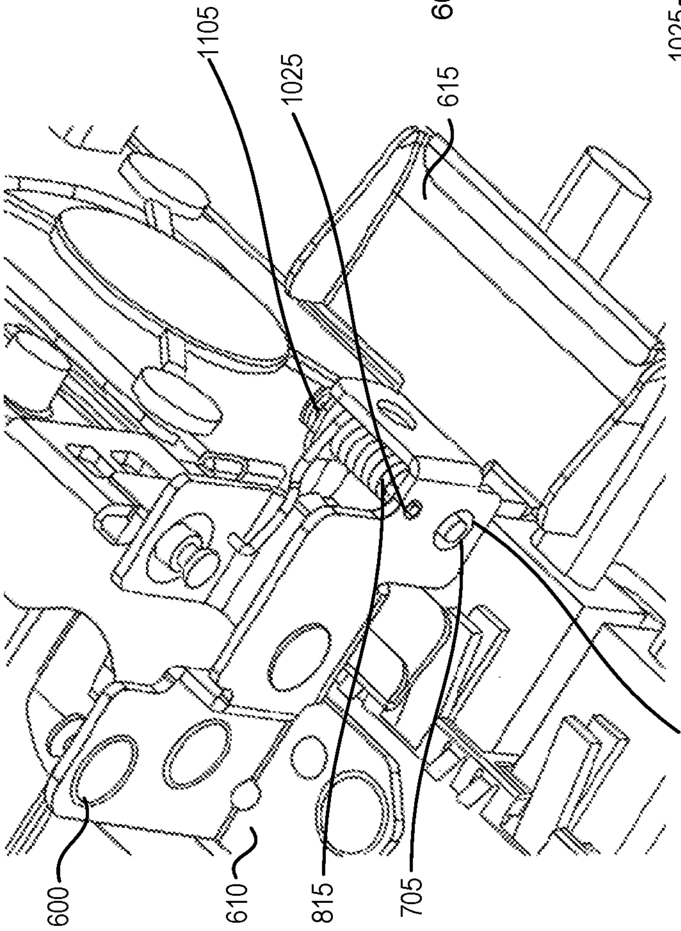
FIG. 11 is a perspective view of a seesaw assembly, according to an embodiment of the present disclosure.

FIG. 11 shows a perspective view of seesaw assembly 600 physically coupled to a chassis bracket. The perspective view is shown with retainer 605 removed to show how rivet pin 705 and spring 815 may be configured. Rivet pin 705 may include a head 1105 on one end which is disposed with opening 1010 of seesaw bracket 615. Rivet pin 705 may also include a tail that is disposed with openings 1015 and 1020. Spring 815 may be fitted through rivet pin 705, wherein one end of spring 815 may be through opening 1025 while another end is at another opening of base bracket 610.

Figure 12:
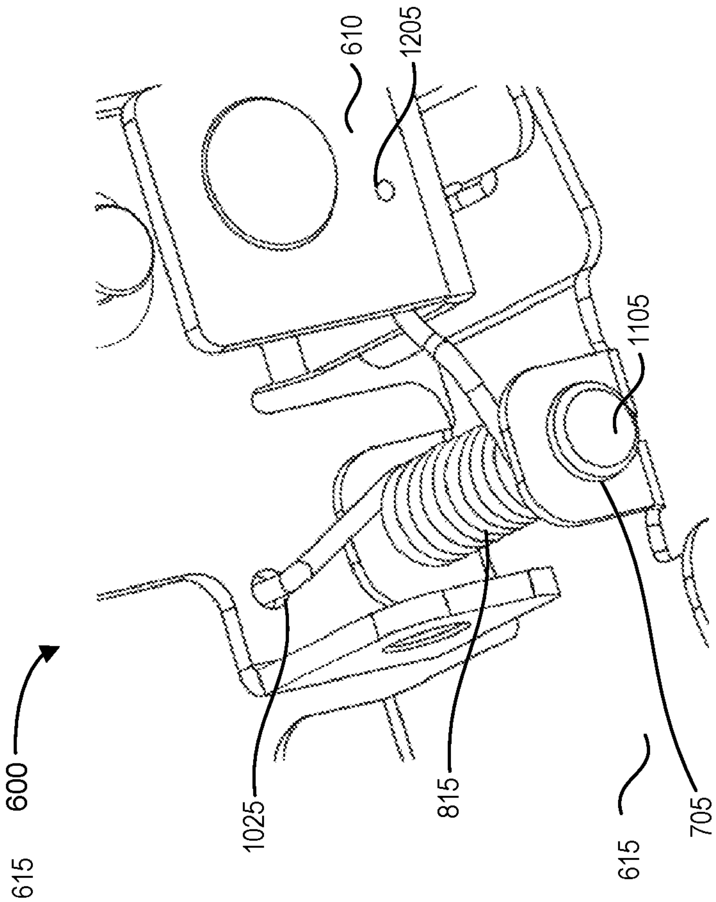
FIG. 12 is a perspective view of a seesaw assembly, according to an embodiment of the present disclosure.

FIG. 12 shows a perspective view of seesaw assembly 600. The perspective view is shown with retainer 605 removed to show a configuration of rivet pin 705 and spring 815 respective seesaw bracket 615 and base bracket 610. In this example, rivet pin 705 may have been inserted through one opening of seesaw bracket 615, wherein head 1105 of rivet pin 705 may abut the opening. Spring 815 may be fitted through rivet pin 705, wherein one end of spring 815 may be through opening 1025 while another end may be through an opening 1205 of base bracket 610. Accordingly, spring 815 may be supported by base bracket 610 and seesaw bracket 615.

Figure 13:
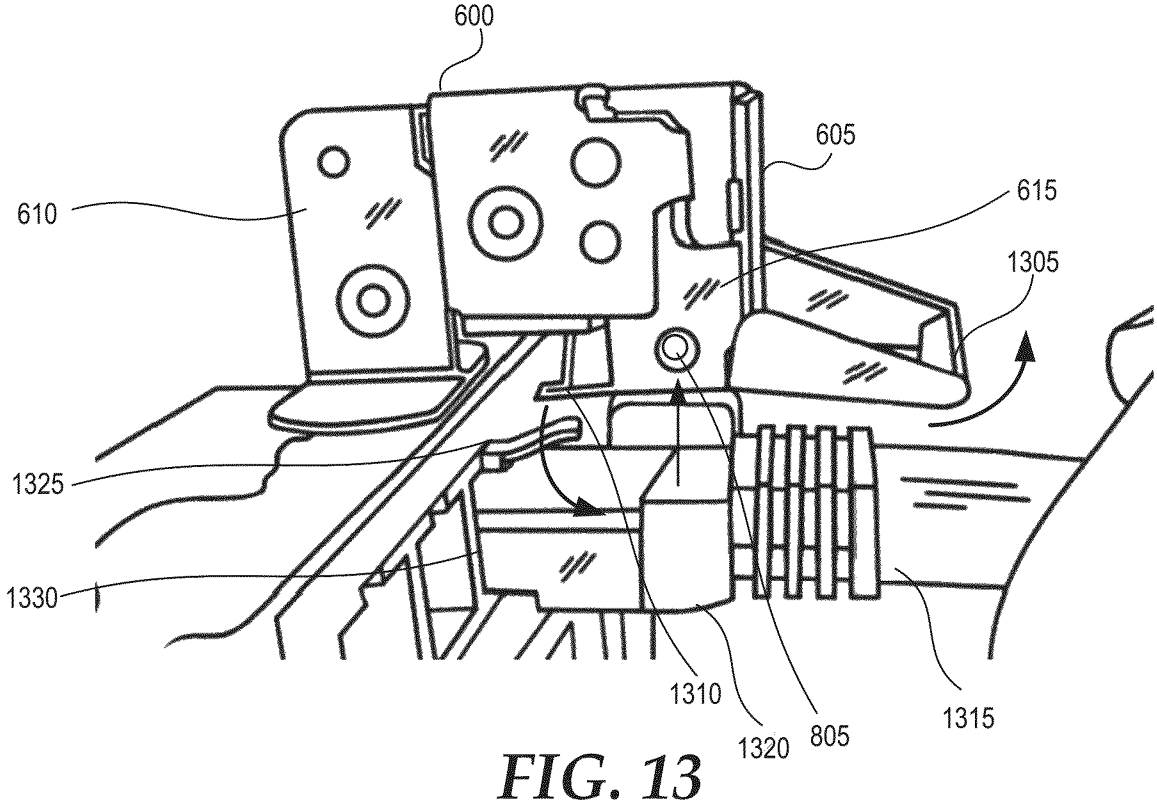
FIG. 13 is a perspective view of a seesaw assembly and a mezzanine card with a cable plugged into a socket, according to an embodiment of the present disclosure.

FIG. 13 shows a perspective view of a seesaw assembly 600 and a mezzanine card with a cable 1315 plugged into a socket 1330 of the mezzanine card. Cable 1315 includes a connector 1320 with a restraining latch 1325. Seesaw assembly 600 includes retainer 605, base bracket 610, and seesaw bracket 615. Seesaw bracket 615 includes an actuator 1305 on one end and a sloped end 1310 on another end. At this point, seesaw bracket 615 is in a normal state, wherein there is a gap between restraining latch 1325 and sloped end 1310.

Figure 14:
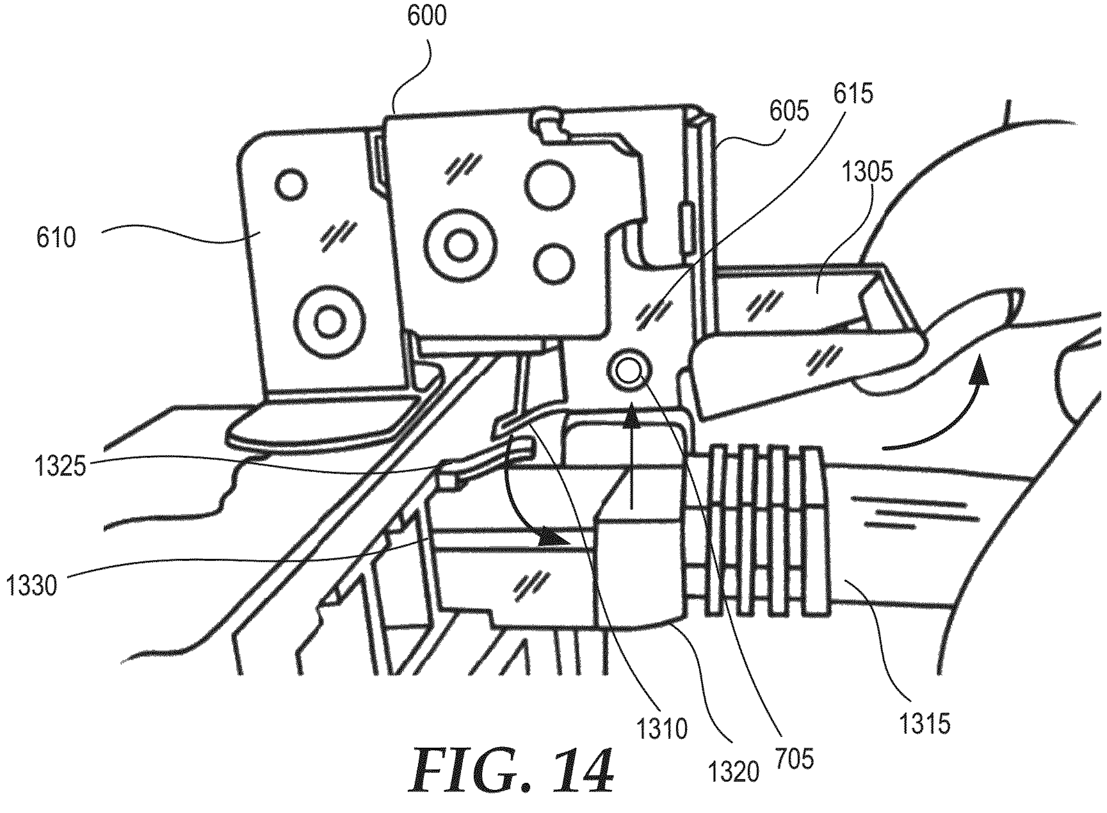
FIG. 14 is a perspective view of a seesaw assembly and a mezzanine card with a cable plugged into a socket, according to an embodiment of the present disclosure.

FIG. 14 shows a perspective view of a seesaw assembly 600 and a mezzanine card with a cable 1315 plugged into a socket 1330 of the mezzanine card. Seesaw assembly 600 includes retainer 605, base bracket 610, and seesaw bracket 615. At this point, a force is applied to actuator 1305, such as via a finger which may cause actuator 1305 to be raised upward. Seesaw bracket 615 and base bracket 610 may be rotatably coupled via rivet pin 705. Rivet pin 705 may act as a pivot point or a fulcrum. Seesaw bracket 615 may be configured to move around the fulcrum when a force is applied to actuator 1305. For example, seesaw bracket 615 may rotate around the fulcrum which may cause sloped end 1210 to move in the opposite direction of actuator 1305. In particular, when a force is applied to actuator 1305, a spring around rivet pin 705 and/or rivet pin 705 may rotate and the spring may apply a force as it rotates, wherein the force may cause sloped end 1310 to move in the direction opposite of actuator 1305. For example, when actuator 1305 is pushed upward, sloped end 1310 may move downward. At this point, actuator 1305 as well as sloped end 1310 may be at an angled position.

Sloped end 1310 in turn may apply force to restraining latch 1325 of cable 1315. This force may release hooks of restraining latch 1325 from stop features of socket 1330. At this point, seesaw bracket 615 is at a latch release state. Accordingly, the user may pull cable 1315 and/or connector 1320 from socket 1330. When the force applied to actuator 1305 is released, actuator 1305 may return to its prior position, and seesaw bracket 615 may rotate and cause sloped end 1310 to return to its prior position. In particular, when force to actuator 1305 is released, seesaw bracket 615 may return to the normal state.

Figure 15:
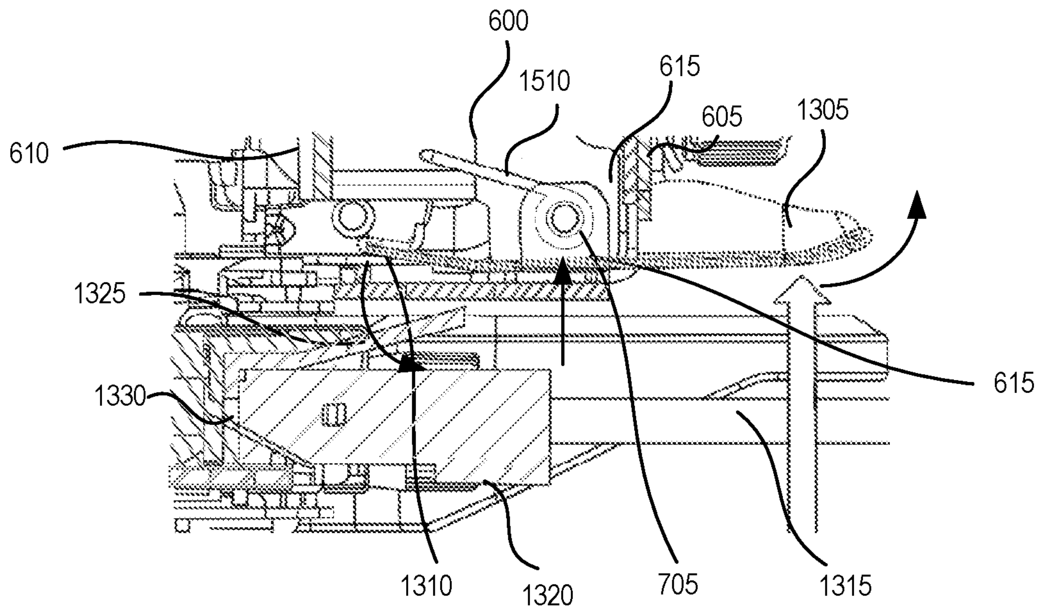
FIG. 15 is a cross-sectional view of the seesaw assembly and the mezzanine card with the cable plugged into the socket of FIG. 12, according to an embodiment of the present disclosure.

FIG. 15 shows a side view of a cross-section of seesaw assembly 600 and the mezzanine card with cable 1315 plugged in socket 1330 of FIG. 13. As discussed above, seesaw assembly 600 includes retainer 605, base bracket 610, and seesaw bracket 615. The view includes seesaw assembly 600 in a normal state. While in the normal state, seesaw bracket 615 is in a relatively horizontal position. In particular, actuator 1305 and sloped end 1310 of seesaw bracket 615 may be both in a relatively horizontal position. While in the normal state, spring 1510 around rivet pin 705 may be in a neutral state. In addition, restraining latch 1325 may be secured at stop features of the socket that connector 1320 is plugged into. This keeps cable 1315 locked in the socket.

Figure 16:
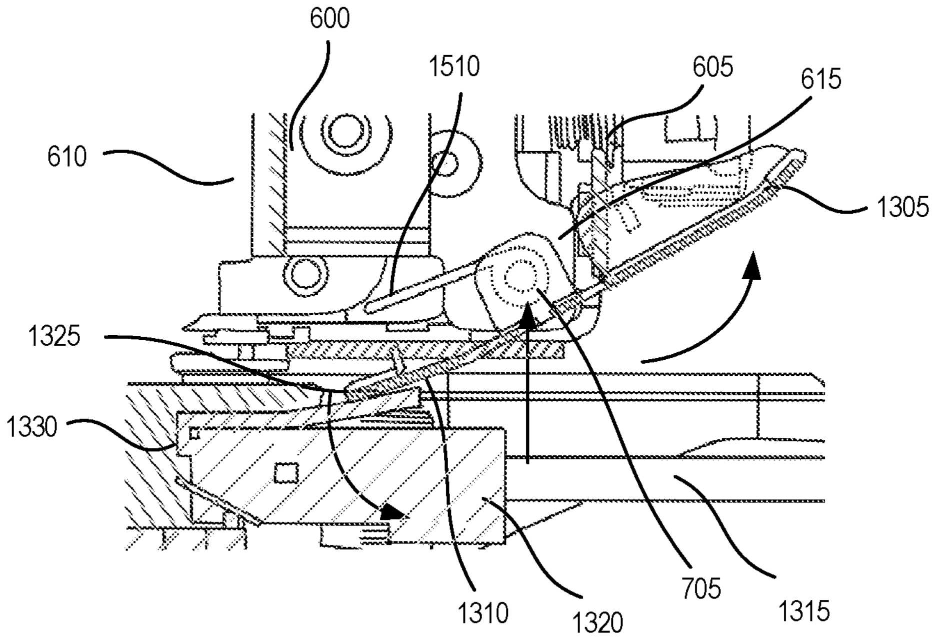
FIG. 16 is a cross-sectional view of the seesaw assembly and the mezzanine card with the cable plugged into the socket of FIG. 13, according to an embodiment of the present disclosure.

FIG. 16 shows a side view of a cross-section of seesaw assembly 600 and the mezzanine card with cable 1315 plugged in socket 1330 of FIG. 14. As discussed above, seesaw assembly 600 includes retainer 605, base bracket 610, and seesaw bracket 615. The view includes a seesaw assembly 600 in a latch release state. At this state, a force may have been applied, such as by a finger, to actuator 1305 directed upwards as depicted by the direction of an arrow. During the application of the force, seesaw bracket 615 may rotate around rivet pin 705 which may be poking through an opening. During the rotation, spring 1510 may operably apply a force on a sloped end 1310 based on the actuation of actuator 1305. The force applied by spring 1510 may cause sloped end 1310 to move in the opposite direction of actuator 1305, as depicted by an arrow. As sloped end 1310 moves downward, it may apply a force to restraining latch 1325 of a connector 1320. This force may push restraining latch 1325 and may automatically release restraining latch 1325 from the socket. When connector 1320 is in a released state, the user may now be able to pull cable 1315 from socket 1330 of the mezzanine card.

Upon release of the force applied to actuator 1305, such as by removal of the finger, seesaw bracket 615 may rotate and move towards its prior position, such as the normal state. In particular, during this rotation, spring 1510 may operably remove the force applied to sloped end 1310. The removal of the force applied by spring 1510 may cause sloped end 1310 to move in the opposite direction of actuator 1305, towards the prior position, such as to the normal state. This movement may automatically remove the force applied to restraining latch 1325 of connector 1320. If a user has not unplugged cable 1315 from the socket, the removal of the force may lock restraining latch 1325 back to the socket.

In the above figures, an information handling system is illustrated in a manner where some components are not shown. For example, a top cover of a chassis or internal components of the information handling system may not be included in the figures to highlight features of embodiments of the invention. One of ordinary skill in the art will appreciate that an information handling system in accordance with embodiments of the invention may include additional or fewer components than those illustrated in the following figures. In addition, although the examples shown above refer to a rackmount server, one of ordinary skill in the art will appreciate that the present disclosure may include other rackmount appliances instead.

When referred to as a "device," a "module," a "unit," a "controller," or the like, the embodiments described herein can be configured as hardware. For example, a portion of an information handling system device may be hardware such as an integrated circuit (such as an Application Specific Integrated Circuit (ASIC), a Field Programmable Gate Array (FPGA), a structured ASIC, or a device embedded in a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes, or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A seesaw assembly comprising:

a seesaw bracket; and a base bracket rotatably coupled to the seesaw bracket, wherein the seesaw bracket rotates around a pivot when a force is applied on an actuator end of the seesaw bracket, wherein a sloped end of the seesaw bracket moves in an opposite direction of the actuator end as the seesaw bracket rotates around the pivot that pushes down a retaining latch of a cable connector releasing the cable connector from a port, and wherein the seesaw bracket further comprises a spring that is physically coupled to a rivet pin that is inserted through openings in the seesaw bracket.

2. The seesaw assembly of claim 1, further comprising a retainer configured to attach the seesaw bracket to a peripheral component interconnect express riser.

3. The seesaw assembly of claim 2, wherein the retainer includes a first mounting hole to be mounted on a mounting feature of a peripheral component interconnect express card.

4. The seesaw assembly of claim 1, wherein the seesaw bracket is configured to rotate around the pivot from a normal state to a latch release state.

5. The seesaw assembly of claim 4, wherein each end of the spring is inserted through other openings in the seesaw bracket.

6. The seesaw assembly of claim 1, wherein the cable connector is disposed underneath the seesaw assembly.

7. The seesaw assembly of claim 1, wherein the releasing of the cable connector includes disengaging a hook feature of the cable connector from a stop feature of the port.

8. The seesaw assembly of claim 1, wherein the cable connector is a registered jack connector.

9. The seesaw assembly of claim 1, wherein the retaining latch is proximate to the sloped end of the seesaw bracket.

10. The seesaw assembly of claim 1, wherein the base bracket is configured to attach to a chassis bracket of a rackmount appliance.

11. An information handling system, comprising:

a seesaw assembly having a connector latch disengagement mechanism, the seesaw assembly including;

a base bracket that is rotatably coupled to a seesaw bracket; and the seesaw bracket that is configured to rotate around a pivot when a force is applied on an actuator end of the seesaw bracket, wherein a sloped end of the seesaw bracket moves in an opposite direction of the actuator end as the seesaw bracket rotates around the pivot which pushes down a retaining latch of a cable connector releasing the cable connector from a port of the information handling system, and wherein the seesaw bracket further comprises a spring that is physically coupled to a rivet pin that is inserted through openings in the seesaw bracket.

12. The information handling system of claim 11, wherein the information handling system is a rackmount server.

13. The information handling system of claim 12, wherein the rackmount server includes a peripheral component interconnect express riser with a mounting feature.

14. The information handling system of claim 13, wherein the seesaw assembly further includes a retainer configured to attach the seesaw bracket to the mounting feature of the peripheral component interconnect express riser.

15. The information handling system of claim 11, wherein the cable connector is a registered jack connector.

16. The information handling system of claim 11, wherein the port is at a mezzanine card of the information handling system.

17. A seesaw assembly comprising:

a base bracket that is rotatably coupled to a seesaw bracket; and the seesaw bracket is configured to rotate around a pivot when a force is applied on an actuator end of the seesaw bracket, wherein a sloped end of the seesaw bracket moves in an opposite direction of the actuator end as the seesaw bracket rotates around the pivot that pushes down a retaining latch of a cable connector releasing the cable connector from a port, wherein the seesaw bracket further comprises a spring that is physically coupled to a rivet pin that is inserted through openings in the seesaw bracket.

18. The seesaw assembly of claim 17, wherein the seesaw bracket further includes a retainer configured to attach the seesaw bracket to a peripheral component interconnect express riser.

19. The seesaw assembly of claim 17, wherein the cable connector is a registered jack connector.

20. The seesaw assembly of claim 17, wherein the seesaw bracket further comprises the spring physically coupled to the rivet pin.

* * * * *